July 15, 1947. R. H. HERRICK Re. 22,897

TRANSMISSION SYSTEM

Original Filed Aug. 14, 1939 2 Sheets-Sheet 1

INVENTOR.
Roswell H. Herrick
BY Davis, Lindsey, Smith & Shonts
Attorneys.

July 15, 1947. R. H. HERRICK Re. 22,897

TRANSMISSION SYSTEM

Original Filed Aug. 14, 1939 2 Sheets-Sheet 2

INVENTOR.
Roswell H. Herrick
BY Davis, Lindsey, Smith & Shonts
Attorneys.

Reissued July 15, 1947

Re. 22,897

UNITED STATES PATENT OFFICE 22,897

TRANSMISSION SYSTEM

Roswell H. Herrick, Oak Park, Ill., assignor to Automatic Electric Laboratories, Inc., a corporation of Delaware Original No. 2,371,291, dated March 13, 1945, Serial No. 404,136, July 26, 1941, which is a division of Serial No. 290,090, August 14, 1939. Application for reissue July 26, 1945, Serial No. 607,231

11 Claims. (Cl. 179—81)

Figures 1, 1A:
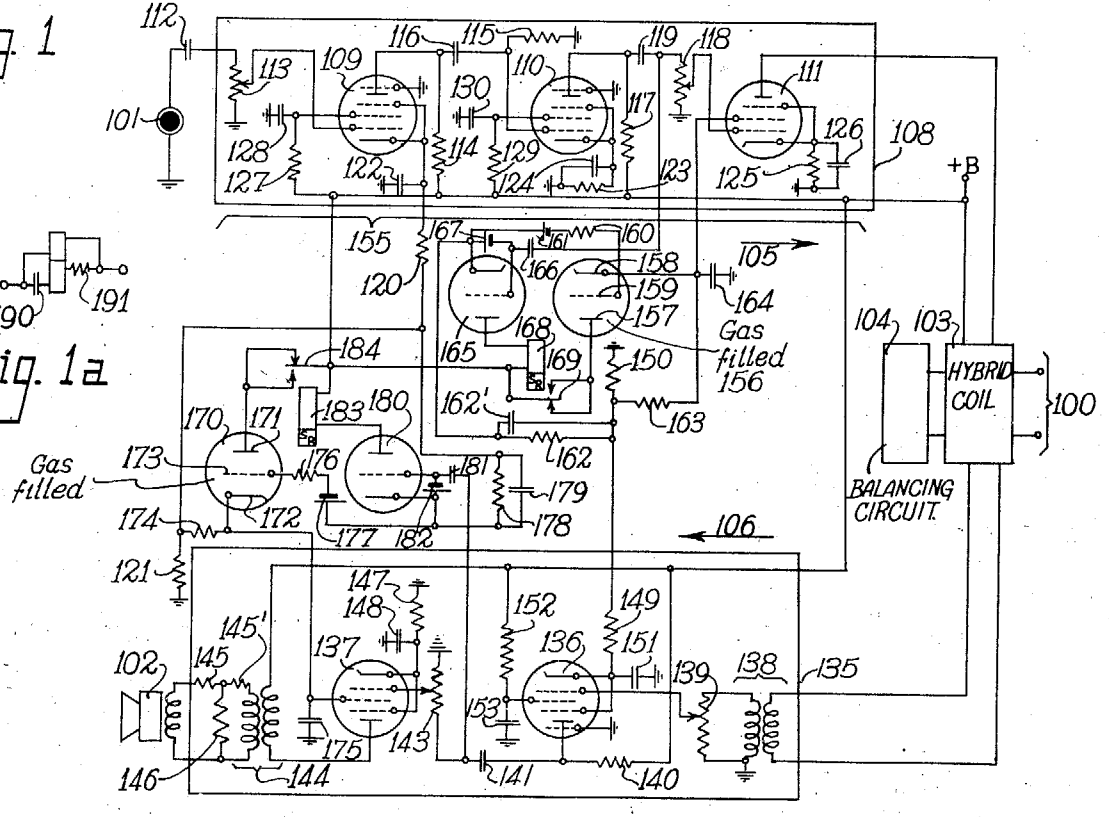

The present invention relates generally to improvements in signal current transmission systems of the type in which signal controlled switching circuits are provided for partially or completely blocking, under certain conditions, certain of the signal current channels included therein and, more particularly, to improvements in telephone substation circuits having incorporated therein coupled signal current channels for the transmission of incoming and outgoing signal currents. This application is a division of copending application Serial No. 290,090, filed August 14, 1939, Roswell H. Herrick, now Patent No. 2,282,405, granted May 12, 1942.

In the usual telephone substation circuit a hybrid system or antiside tone impedance network is provided for preventing signal currents developed during operation of the transmitter from being transmitted to the receiver and for similarly preventing signal currents incoming over the line extending to the substation from being transmitted to the transmitter for reproduction. In this type of arrangement one of the factors which determines the efficiency of the side tone suppression is the impedance of the talking circuit established by way of two connected subscribers' lines. This impedance is not the same for any two different established connections, and, accordingly, the hybrid system of each substation is usually balanced to provide maximum side tone suppression efficiency for average line conditions. In installations wherein amplification of incoming and outgoing signal currents is required, as, for example, in executive loud speaking sets, the conditions of unbalance introduced in the substation circuit by the impedances of the lines over which an established connection extends may become intolerable. This is particularly true in substation installations provided in an exchange area where the subscribers' lines are of widely different lengths. In order completely to obviate or to minimize the singing which may result due to unbalance of the substation circuit occasioned by unfavorable line conditions, signal controlled switching means may be provided in the substation circuit for selectively blocking the channels when not in use. In the usual arrangement of this character the signal channels are completely blocked when not in use. More particularly, during intervals when the transmitting means of the substation is being used to transmit outgoing signal currents, the incoming signal current channel is rendered completely inactive. Conversely, during those periods when signal currents are incoming to the substation, the transmitting or outgoing signal current channel is rendered completely inactive. An arrangement of this character, while satisfactory in operation, prevents any interruption of a speech train being transmitted in one direction in response to signal currents transmitted in the opposite direction. In other words, conversation break-ins are positively prevented.

It is an object of the present invention to provide improved telephone substation apparatus of the character described wherein the channels are preferably only partially blocked when not in use, the blocking of the signal current transmitting and receiving channels is accomplished in a simple and reliable manner, and wherein the control circuits are arranged to be exceedingly fast in operation so that speech clipping is minimized.

It is another object of the invention to provide an improved transmission system particularly suited for use in telephone substation circuits of the character described wherein the control or channel blocking circuit is arranged in an improved manner to utilize gaseous discharge tubes of the three-electrode type, whereby the circuit is rendered exceedingly fast in operation to effect channel blocking and unblocking operations without any substantial speech clipping.

It is still another object of the invention to provide an improved and exceedingly simple arrangement for deionizing the gaseous discharge tubes each time the transmission of signal currents over either of the two channels is arrested.

It is a further object of the invention to provide an improved transmission system of the character described wherein the screen electrode of one of the amplifier tubes in each channel is utilized as the control element for blocking and unblocking the associated channel.

Figure 2:
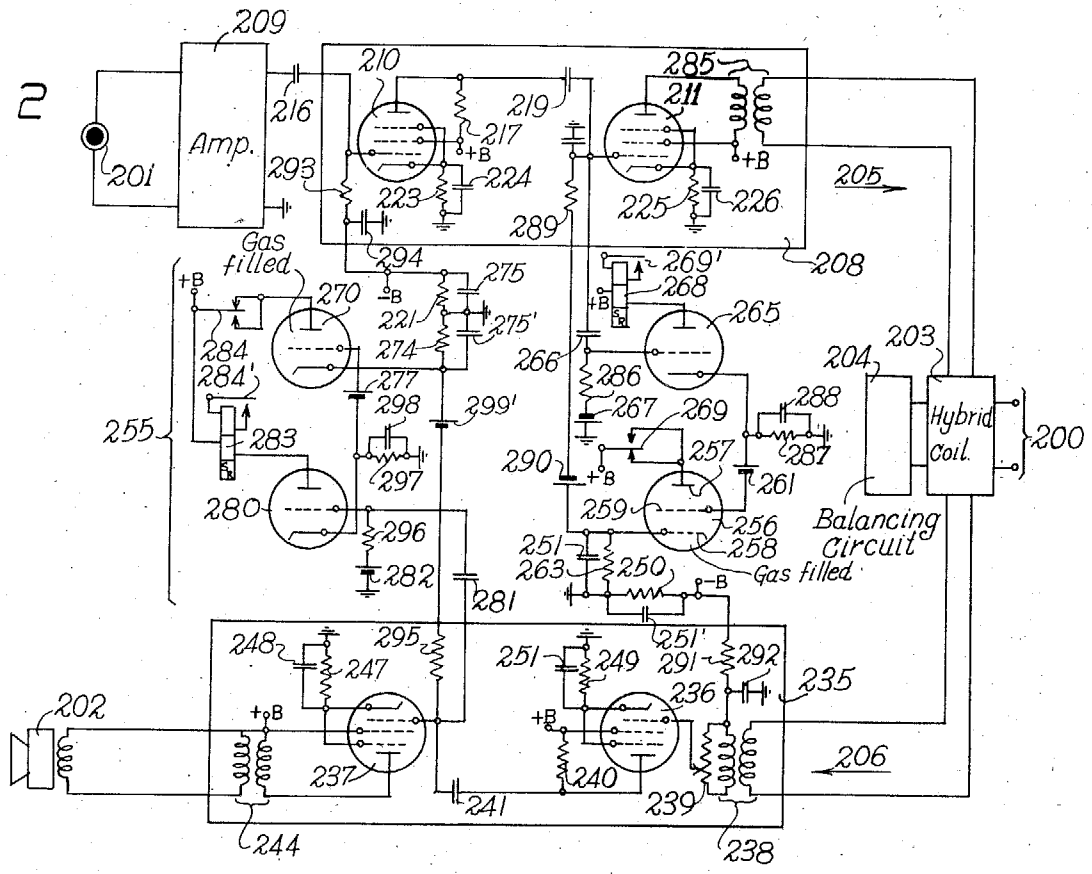

The novel features believed to be characteristic of the invention are set forth with particularity in the appended claims. The invention, both as to its organization and method of operation, together with further objects and advantages thereof, will best be understood by reference to the specification taken in connection with the accompanying drawings in which Figure 1 illustrates a substation circuit having incorporated therein certain of the features of the invention as briefly outlined above; Fig. 1*a* illustrates a slightly different arrangement of certain of the circuit elements shown in Fig. 1; and Fig. 2 illustrates a modified form of the substation circuit shown in Fig. 1.

Referring now more particularly to Fig. 1 of the drawings, the substation circuit there illustrated is adapted to be connected to a telephone line terminating at the terminals 100 which may, for example, form a part of a conventional automatic or manual telephone system, in which case, the distant end thereof will terminate in a line circuit the character of which is determined by the character of the exchange. Briefly described, the circuit comprises a transmitter or microphone 101 and receiving means in the form of a loud speaker 102 which are adapted respectively to be coupled to an antiside tone impedance network including a hybrid coil 103 and a balancing circuit 104 by means of signal transmission channels 105 and 106. The outgoing signal current channel 105 comprises a vacuum tube amplifier 108 including three stages of amplification respectively including the amplifier tubes 109, 110 and 111, the first of which is adapted to receive signal currents from the microphone 101 and the last of which is arranged to deliver its output to the hybrid system 103. More particularly, the microphone 101 is coupled to the input electrodes of the first amplifier tube 109 through a coupling network which includes a condenser 112 and an adjustable voltage dividing or signal level control resistor 113. The output electrodes of the tube 109 are coupled to the input electrodes of the succeeding amplifier tube 110 through a resistance capacitance coupling network which includes a pair of resistors 114 and 115 and a coupling condenser 116. Similarly the output electrodes of the second amplifier tube 110 are coupled to the input electrodes of the final amplifier tube 111 through a resistance capacitance coupling network which includes a resistor 117, a voltage dividing or signal level adjusting resistor 118 and a coupling condenser 119. In order to bias the control electrode of the tube 109 to the proper negative potential with respect to the associated cathode, there is provided in the cathode leg of the output circuit of this tube a pair of series connected cathode biasing resistors 120 and 121 which are shunted by a signal current by-pass condenser 122. The control grid of the tube 110 is similarly biased to the proper negative potential with respect to its associated cathode by means of a cathode biasing circuit comprising a resistor 123 shunted by a signal current by-pass condenser 124. A similar cathode biasing network comprising a resistor 125 shunted by a by-pass condenser 126 is included in the cathode leg of the output circuit of the final amplifier tube 111. Anode potentials are supplied to the anodes of the tubes 109, 110 and 111 from a source of anode current, not shown, but having its positive terminal connected to the terminal marked +B, over circuits which respectively include the resistors 114, 117 and certain of the windings of the hybrid coil 103. Screen potentials are impressed upon the screen electrodes of the indicated tubes from the anode current source over paths respectively including filter networks, that leading to the screen electrode of the tube 109 including a resistor 127 and a signal current by-pass condenser 128 and that extending to the screen electrode including a resistor 129 and a by-pass condenser 130.

The incoming signal current transmission channel 106 has included therein an amplifier 135 which includes two stages of amplification respectively comprising the amplifier tubes 136 and 137. More specifically, the incoming signal current terminals of the hybrid coil 103 are coupled to the input electrodes of the first amplifier tube 136 through a coupling network which includes a transformer 138 and an adjustable voltage dividing or signal level control resistor 139. The output electrodes of this tube are coupled to the input electrodes of the second amplifier tube 137 through a resistance capacitance coupling network which comprises a resistor 140, a coupling condenser 141 and an adjustable voltage dividing or signal level control resistor 143. The output electrodes of the second amplifier tube 137 are, in turn, coupled to the voice or signal current coil of the loud speaker 102 through a coupling transformer 144 and a T connected signal current level control resistance network comprising a pair of series resistors 145 and 145' and a shunt resistor 146. In order to bias the control electrode of the tube 137 to the proper negative potential with respect to the associated cathode, there is provided in the cathode leg of the output circuit of this tube a biasing network which includes a resistor 147 shunted by a signal current by-pass condenser 148. Control of the bias impressed upon the control electrode of the first amplifier tube 136 is effected through the provision of a cathode biasing network which includes a pair of resistors 149 and 150 which are shunted by a signal current by-pass condenser 151. Anode potentials are impressed upon the anode electrodes of the two tubes 136 and 137 from the source of anode current over circuits respectively including a resistor 140 and the primary winding of the coupling transformer 144. Screen potential is impressed upon the screen electrode of the tube 136 from the source of anode current over a path which includes a filter network comprising a resistor 152 and a by-pass condenser 153. Screen potential for the screen anode of the tube 137 is derived in a manner more fully explained subsequently.

In order to control the gains of the amplifiers 108 and 135, thereby to vary the signal current transmission efficiencies of the channels 105 and 106 in accordance with signal current flow therethrough there is provided a control circuit 155 which includes two control units, the first of which operates in response to signal currents traversing the channel 105 and the second of which operates in response to signal currents traversing the channel 106. More particularly, the first unit of the control circuit comprises a gaseous discharge tube 156 of the three-electrode type having an anode 157 and a cathode 158 separated to define a space current path and a control or start electrode 159 interposed therebetween to control the flow of current over the space current path. The start electrode 159 is normally biased negatively with respect to the cathode 158 over a path which serially includes a resistor 160, a source of bias voltage 161, a resistor 162 and a resistor 163. The space current path of the discharge tube 156 is included in the output circuit of this tube in series with the source of anode potential mentioned above and the resistors 150 and 163, whereby control voltages are developed across these resistors when a discharge through the tube is established, which voltages are utilized to control the final amplified tube 111 included in the channel 105 and the first amplifier tube 136 included in the channel 106. More particularly, the voltage developed across the two series connected resistors 150 and 163 in response to space current traversing the tube 156 is utilized as the screen potential for the amplifier tube 111, whereby this amplifier tube is only rendered operative to transmit signal currents therethrough in response to a flow of current over the space current path of the tube 156. Since the resistor 150 is also included in the cathode biasing circuit of the amplifier tube 136, the voltage across this resistor also functions to control the signal current gain of the amplifier 135. The two serially connected resistors 150 and 163 are heavily by-passsed for signal currents through the provision of a low impedance condenser 164. In order to impress a start potential upon the start grid 159 of the discharge tube 156 when signal currents traverse the channel 105 a rectifying unit is provided which includes a three-electrode vacuum tube 165 having it input electrodes coupled to the channel 105 at a point following the amplifier tube 110 and over a circuit which includes a coupling condenser 166. The tube 165 is normally biased to operate as a half wave rectifier by means of a bias battery 167 connected between the input electrodes thereof. The output electrodes of the rectifier tube 165 are included in an output circuit which comprises the two resistors 150 and 162 and the source of anode current connected to the terminal marked +B. In order momentarily to interrupt the output circuit of the gaseous discharge tube 156 when signal current flow over the channel 105 is arrested, there is provided a slow-to-release relay 168 having its winding included in the output circuit of the tube 165 to be energized by space current traversing this tube. This relay is provided with an armature 169 which is arranged to interrupt the output circuit of the discharge tube 156.

The second control unit embodied in the control circuit 155, namely, that associated with and responsive to signal currents traversing the channel 106 is essentially identical to that just described and provided in association with the channel 105. More particularly, the second control unit comprises a three-electrode gaseous discharge tube 170 having an anode 171 and a cathode 172 separated to define a space current path and a start electrode 173 interposed in this path for the purpose of controlling the initial flow of current thereover. The output electrodes 171 and 172 of this tube are included in an output circuit which also includes the resistor 121, a second resistor 174 and the source of anode current connected to the terminal marked +B. The voltage developed across these two series connected resistors when space current flows through the tube 170 is utilized as the operating potential for the screen electrode of the amplifier tube 137 included in the channel 106, these two resistors being heavily bypassed for signal currents by a low impedance condenser 175 connected in shunt therewith. Since the resistor 121 forms a part of the cathode biasing circuit for the first amplifier tube 109 included in the outgoing signal current channel 105, the voltage across the resistor serves to determine the gain of the indicated amplifier tube and thus the signal current tranmission efficiency of the channel 105. The start electrode 173 of the discharge tube 170 is normally biased negatively with respect to its associated cathode over a path which includes a resistor 176, a source of bias voltage 177, a second resistor 178 shunted by a signal current by-pass condenser 179 and the resistor 174. For the purpose of impressing a start potential upon the start electrode 173 when signal currents traverse the channel 106, a rectifier is provided which comprises a three-electrode vacuum tube 180 having its input electrodes coupled to the channel 106 at a point following the amplifier tube 136 over a circuit including a coupling condenser 181. This tube is normally biased to operate as a half wave rectifier by means of a bias battery 182 connected between the input electrodes thereof. The output electrodes of the tube 180 are included in an output circuit which serially comprises the resistors 121 and 178. In order to control the deionization of the discharge tube 170 there is provided a slow-to-release relay 183 having its operating winding included in the output circuit of the tube 180 and provided with an armature 184 which is operative to make and break the output circuit of the discharge tube 170.

Referring now more particularly to the operation of the system illustrated in Fig. 1, it is pointed out that in order to condition the signal current channels for signal current transmission, the cathode heater circuit, not shown, for the various tubes illustrated, is first closed. With the apparatus in this condition the amplifier stages respectively comprising the tubes 109, 110 and 136 are all biased to operate at normal gain. Since, however, the two discharge tubes 156 and 170 are at this time in a deionized condition, no screen potentials are available for the screen electrodes of the final amplifier tubes 111 and 137 respectively included in the amplifiers 108 and 135. Thus, both channels are effectively blocked so that no circulation of energy around thet system can occur. If, with the apparatus in this condition, a user of the substation circuit speaks into the microphone 101, the resulting signal voltage is impressed upon the input electrodes of the amplifier tube 109 and the amplified output voltage is, in turn, impressed upon the input electrodes of the tube 110. As further amplified by the tube 110 the signal voltage is impressed across the input electrodes of the amplifier stage 111 and also through the condenser 166 across the input electrodes of the rectifier tube 165. During alternate half cycles of this voltage the bias potential impressed upon the control electrode of the tube 165 by the battery 167 is overcome so that space current flows through this tube over a circuit which includes the winding of the relay 168, the resistor 162 and the resistor 150. As indicated above, during signal current transmission through the channel 105, due to the magnitude of the bias impressed across the control electrodes thereof by the battery 167, the vacuum tube 165 functions as a half wave rectifier. Accordingly, a pulsating direct current traverses the space current path of this tube and the resistors 162 and 150. Due to the smoothing action of the condenser 162′ shunting the resistor 162, however, the voltage across this resistor does not fall to a zero value during alternate half cycles of signal current but is maintained at a value sufficient to permit ionization of the discharge tube 156. The resulting voltage developed across the resistor 162 is impressed across the input electrodes 158 and 159 of the discharge tube 156 in opposition to the negative bias voltage afforded by the C battery 161. This voltage is of sufficient magnitude to lower the potential of the start grid 159 to a point where a discharge through this tube occurs. When the tube 156 is ionized in this manner, current is caused to traverse the space current path thereof; this current also flowing through the series connected resistors 150 and 163. The last-mentioned resistor has a resistance value substantially greater than that of the resistor 150 and also substantially greater than the resistance of the space current path through the tube 156. Accordingly, a substantial portion of the available voltage of the anode current supply source appears as a voltage drop across the resistor 163. This voltage drop, as augmented by the voltage drop across the resistor 150, is impressed as an operating potential upon the screen electrode of the final amplifier tube 111 included in the channel 105, thereby to render the tube 111 operative to transmit the generated signal currents therethrough and through the hybrid coil 103 to the line terminating at the terminals 100. As indicated above, the operations just described all occur during the first cycle of the signal current developed in response to the sound waves impinging upon the diaphragm of the microphone 101. Accordingly, no substantial clipping of the first syllable of the speech represented by the sound waves occurs. Simultaneously with the activation of the amplifier tube 111, the first amplifier tube 136 of the channel 106 is either biased to have a very low gain therethrough or beyond cut-off, depending upon the constants of the control circuit. Thus, the current traversing the resistor 150 and flowing through the space current paths of the tubes 156 and 165 causes a voltage to be developed across this resistor which is impressed through the resistor 149 upon the cathode of the tube 136 as a positive bias. This bias voltage has the effect of lowering the gain of the tube 136 and if of sufficiently large magnitude may serve to bias this tube to a point beyond anode current cut-off such that the channel 106 is completely blocked in the first amplifier stage thereof. Alternatively, if the resistance value of the resistor 150 is chosen so that the voltage developed thereacross by the space currents flowing therethrough does not exceed the anode current cut-off value of the tube 136, this tube will pass incoming signal currents to the succeeding amplifier tube 137 at a substantially reduced gain. By virtue of the arrangement just described if the antiside tone network comprising the hybrid coil 103 and the balancing circuit 104 are greatly unbalanced due to the condition of the lines connected to the terminals 100, such that signal currents are transmitted from the channel 105 through this network to the input side of the channel 106, the partial or complete blocking of the latter channel in the first amplifier stage comprising the tube 136 prevents the signal currents from being fed through the channel to initiate operation of the second control unit comprising the rectifier tube 180 and the discharge tube 170.

From the foregoing explanation it will be apparent that the current traversing the space current path of the tube 165 as a result of signal voltage impressed upon the input electrodes of this tube also traverses the operating winding of the slow-to-release relay 168. Shortly following the first few cycles of this voltage, the relay 168 operates to break, at its armature 169 and the associated back contact, the previously traced output circuit including the space current path of the discharge tube 156. This circuit is recompleted at the armature 169 and its associated working contact when the armature 169 is moved to its attracted position. During the interval required for operation of the armature 169 from its retracted position to its attracted position the output circuit of the tube 156 is held open. Accordingly, the flow of space current through this tube and through the resistors 150 and 163 is momentarily interrupted, causing the final amplifier tube 111 of the channel 105 momentarily to be rendered inoperative and the bias voltage impressed across the input electrodes of the first amplifier tube 136 included in the channel 106 momentarily to be returned to the normal value. During this operation the potential of the start electrode 159 is maintained at a value permitting the flow of space current through the tube 156 due to the continued operation of the rectifier tube 165. Accordingly, immediately the output circuit of the discharge tube 156 is recompleted at the armature 169 and its associated front contact, space current again flows through the tube 156, thereby to render the final amplifier tube 111 operative and partially or completely to block the signal transmission channel 106. During the interval when the armature 169 is operating between its two positions no signal current transmission through the channel 105 can occur. Accordingly, a very slight clipping of the intermediate syllables of the speech train may occur during this switching interval. Such clipping is of no consequence, however, since the listener, upon hearing the first syllables of the speech train and the syllables following the interval during which clipping may occur, can readily ascertain, by interpolation, the syllable or partial syllable which is cut off during the switching operation.

When the flow of signal currents through the channel 105 is arrested, the flow of current through the space current path of the rectifier tube 165 is reduced to zero or to a negligible value. Accordingly, the potential impressed upon the start electrode 159 of the discharge tube 156 is increased in a negative sense to a value which will prevent further current flow through this tube after the tube is deionized. As explained above, the character of the discharge tube 156 is such that when ionization therein occurs the start electrode 159 has no further control over the current flow therethrough. Since, however, the operating winding of the relay 168 is deenergized when the flow of signal currents through the channel 105 is arrested, this relay is caused to restore after an interval. During the interval when the armature 169 of the relay 168 is moving between its attracted and retracted positions the output circuit of the discharge tube 156 is interrupted in an obvious manner so that no voltage is available for sustaining the discharge through the tube. Accordingly, the tube 156 is deionized, at which time the control of the space current path in the tube is restored to the negatively biased start electrode 159. Due to the negative potential impressed upon this electrode by the battery 161, ionization of the tube is prevented when the armature 169 is moved into engagement with its associated back contact to again impress the voltage of the anode current source across the anode 157 and the cathode 158. When the space current flow through the two tubes 165 and 156 is interrupted in the manner just explained, the voltage drops across the resistors 150 and 163 are reduced substantially to zero. Accordingly, the operating potential is removed from the screen electrode of the final amplifier tube 111 and this tube is rendered inoperative to transmit signal currents to the hybrid coil 103. Also, the value of the negative bias impressed across the input electrodes of the amplifier tube 136 is decreased to normal so that this amplifier stage is conditioned to operate with normal gain.

The manner in which the second control unit comprising the rectifier tube 180 and the discharge tube 170 functions partially or completely to block the transmission channel 105 and to activate the final amplifier stage of the channel 106 when signal currents are transmitted from the line terminating at the terminals 100 through the hybrid coil 103 to the input side of the channel 106, is substantially identical to the mode of operation of the first control unit as described above. More particularly, signal currents transmitted to the input electrodes of the tube 136 through the coupling transformer 138 and the voltage divider 139 are amplified by this tube and the amplified signal voltage is impressed across the input electrodes of the two tubes 137 and 180. The resulting space current flow through the rectifier tube 180 causes the ionization of the discharge tube 170, whereby a relatively heavy current is caused to traverse the control resistors 121 and 174. The voltage drop across these two serially connected resistors is utilized as an operating voltage for the screen electrode of the tube 137, whereby this tube is rendered operative to amplify the signal currents and transmit the same through the transformer 144 and the T-connected volume control resistor network to the signal current coil of the loud speaker 102 for reproduction. The voltage developed across the resistor 121 is impressed as a negative bias between the input electrodes of the first amplifier tube 109 included in the channel 105, whereby this tube is either rendered completely inoperative to transmit signal currents therethrough or the gain of the tube is reduced to a very low value. Shortly following the initial flow of signal currents through the channel 106, the slow-to-release relay 183, which is energized by the space current of the tube 180, operates momentarily to extinguish the flow of space current through the discharge tube 170 with the result that the channel 106 is momentarily blocked and the amplifier 109 is momentarily reconditioned to operate with normal gain in the manner described above with reference to signal transmission through the channel 105. During the transmission of signal currents through the channel 106 to the loud speaker 102, the T-connected resistance network included in this channel between the coupling transformer 144 and the signal current coil of the loud speaker operates in a well-known manner to maintain the sound output level of the loud speaker substantially constant regardless of changes in the level of the signal currents transmitted to the input side of the channel. When signal current transmission through the channel 106 is arrested the flow of space current through the rectifier tube 180 is arrested. Thus, the operating winding of the relay 183 is deenergized and the potential impressed upon the start electrode 173 of the discharge tube 170 is restored to a negative value which will not permit ionization of the tube after the tube has been deionized. After an interval equal to the release period of the relay 183, the armature 184 is moved from its attracted position to its retracted position. During such movement, the output circuit of the tube 170 is interrupted, thereby to disconnect the source of anode voltage from the anode 171. As a result, the tube is deionized and control of the space current path thereof is restored to the negatively biased start electrode 173. When the flow of space current through the two resistors 121 and 174 is arrested the potential impressed upon the screen electrode of the amplifier tube 137 is reduced substantially to zero, whereby this tube is rendered inoperative. Also, the voltage drop across the resistor 121 is sufficiently reduced to permit the amplifier tube 109 of the channel 105 to operate with substantially normal gain.

The purpose of providing the relays 168 and 183, having slow-to-release characteristics, for controlling the output circuits of the tubes 156 and 170 respectively is to prevent clipping. More particularly, the period or interval required for the release of either of these two relays prevents the blocking of the channels during momentary pauses in signal current transmission through the respective associated channels. To this end, the relay 168, for example, provides a hang-over period, during which the discharge through the tube 156 is sustained, which exceeds the short pauses occurring in normal speech. Similarly, the slow-to-release period of the relay 183 serve to sustain the flow of space current through the discharge tube 170 for intervals during which short speech pauses may occur.

A modified arrangement for obtaining the delay intervals just described is illustrated in Fig. 1*a*. The relay arrangement illustrated in this figure may be used in lieu of of the relays 168 and 183 as shown in Fig. 1 without changing the armature and contact spring assemblies. In the Fig. 1*a* arrangement the relay coil comprises a pair of differentialy related windings, the lower winding of which is connected in series with a condenser 190 and a resistor 191 across the upper winding. Also, the lower winding is constructed to provide a substantially greater number of ampere turns than the upper winding. With this arrangement included in the circuit of Fig. 1 the initial rush of current through the upper winding occasioned by a flow of space current through the tube 165, for example, causes the relay armature rapidly to be attracted. During such energization, the condenser 190 charges relatively slowly so that the flow of current through the lower winding is relatively low and no substantial opposing action occurs. When the flow of current through the upper winding is decreased or completely arrested, the condenser 190 discharges through the two windings of the relay in series so that the ampere turns represented by the two windings are in aiding phase relation and the armature of the relay is maintained in its attracted position for a short time interval after the current flow through the associated space current path ceases.

If the circuit constants of the circuit illustrated in Fig. 1 are so proportioned that each of the first amplifier stages respectively comprising the tubes 109 and 136 is not completely blocked when the complementary transmission channel is active, the arrangement permits what is known as conversation break-ins to occur. In this regard it will be apparent that signal currents transmitted to the substation circuit over the line connected to the terminals 100 are passed through the hybrid coil 103 to the input side of the channel 106 at a reasonably high intensity as compared with the currents transmitted from the channel 105 to the channel 106 through the hybrid coil during operation of the microphone 101. With the circuit so arranged that the gain of the amplifier stage comprising the tube 136 is only reduced to a low value during signal transmission through the channel 105, the incoming signal currents are transmitted at reduced gain through this first amplifier stage of the channel 106 and are impressed across the input electrodes of the rectifier tube 180, whereby the discharge tube 170 is ionized in the manner previously explained. In response to the flow of space current through the discharge tube 170 the required operating voltage is impressed upon the screen electrode of the amplifier tube 137, thereby to render this tube operative to transmit the incoming signal currents to the loud speaker 102 for reproduction. The activation of the amplifier stage comprising the tube 111 is accompanied by a decrease in the gain of the amplifier stage comprising the tube 136 for reasons which will be apparent from the preceding explanation. After the initial conversation break-in, the user of the illustrated substation circuit is expected to cease speaking, whereby the control unit comprising the rectifier tube 165 and the discharge tube 156 operates to block the channel 105 and to increase the gain through the amplifier stage comprising the tube 136, in the manner pointed out above. In a manner similar to that just described, the user of the substation circuit illustrated may break in upon a speech train being transmitted to the circuit by speaking into the microphone 101 to cause the activation of the channel 105 and a decrease in the gain of the amplifier tube 136, providing the circuit constants of the control circuit 155 are chosen so that the first amplifier stage of the amplifier 108 is not completely blocked when signal currents are being transmitted through the channel 106.

While it will be understood that tubes of any desired type having the proper operating characteristics may be used in the circuit illustrated in Fig. 1, preferably, the amplifier tubes 109, 110 and 136 are of the type commercially known as the 6J7G tube; the amplifier tubes 111 and 137 are of the type known as the 25A6G tube; the rectifier tubes 165 and 180 are of the type known as the 6C5G tube; and the gaseous discharge tubes 156 and 170 are of the type commercially known as the 884 tube.

The arrangement illustrated in Fig. 2 of the drawings is substantially similar to that shown in Fig. 1, but differs therefrom in that a different method is employed for controlling the gain of the amplifier stages included in the respective channels and a different type of relay arrangement is utilized for controlling the deionization of the two gaseous discharge tubes embodied therein. Due to the similarity between the two circuits, corresponding elements thereof have been identified by reference characters having the same tens and units digits but different hundreds digits respectively corresponding to the two figures. In the arrangement of Fig. 2, the first stage of amplification 209, included in the channel 205 is diagrammatically illustrated and the output electrodes of the last amplifier tube included in this channel are coupled to the outgoing signal current terminals of the hybrid coil 203 through a coupling transformer 285. The control circuit 255 illustrated in Fig. 2 differs from the corresponding circuit 155 illustrated in Fig. 1 in that each of the two relays 268 and 283 provided for controlling the deionization of the two discharge tubes 256 and 270, respectively, are double wound relays, the extra winding being arranged to be short-circuited in response to energization of the relay, whereby an additional slow-to-release period is imparted thereto. The two control sections of the circuit are each arranged to control the gain of one amplifier stage in each of the two signal transmission channels. Thus, the control section comprising the rectifier tube 265 and the discharge tube 256, which is coupled to respond to signal currents traversing the channel 205, is arranged to control the bias voltage impressed between the input electrodes of the first amplifier tube 236 included in the channel 206 and the bias voltage impressed between the input electrodes of the amplifier tube 211 included in the channel 205. More particularly, signal voltages developed across the channel 205 at a point following the amplifier tube 210 are impressed upon the input electrodes of the rectifier 265 through a coupling condenser 266. This tube is normally biased to operate as a half wave rectifier by the voltage of the C battery 267 which is connected between the input electrodes of the tube 265 in series with a resistor 286. In order to overcome the bias normally impressed upon the start electrode 259 of the discharge tube 256 by the bias battery 261 when signal currents traverse the channel 205, there is provided in the cathode leg of the output circuit of the rectifier 265 a biasing network which comprises a resistor 287 shunted by a signal current by-pass condenser 288. The load resistors 263 and 250 included in the output circuit of the discharge tube 256 are arranged respectively to control the gains through the amplifier tubes 211 and 236. More particularly, the junction point between these two resistors is grounded and the negative terminal of the anode current source for the tube 256 is connected to the right terminal of the resistor 250. During space current flow through the discharge tube 256 the voltage drop developed across the resistor 263 is impressed through a resistor 289 between the input electrodes of the tube 211 in a direction to overcome the normal negative bias afforded by the C battery 290, thereby to increase the gain of the tube 211. The voltage developed across the resistor 250, on the other hand, is impressed through a filter network which comprises a resistor 291 and a condenser 292, and the voltage divider 239 between the input electrodes of the amplifier tube 236 in a direction to decrease the gain of the last-mentioned tube. In a similar manner, the control voltages developed across the resistors 221 and 274 when space current traverses the discharge tube 270 are utilized reversely to vary the gains through the amplifier tubes 210 and 237, the voltage developed across the resistor 221 being impressed in a negative sense between the input electrodes of the tube 210 through a filter network which comprises a resistor 293 and a condenser 294, and the voltage developed across the resistor 274 being impressed in a positive sense between the input electrodes of the tube 237 through a resistor 295. As illustrated in the drawings, the rectifier tube 280 is coupled through a condenser 281 to be controlled by signal currents traversing the channel 206, the input electrodes of this tube being biased substantially to the anode current cut-off point through the provision of a source of bias voltage 282 which is connected across the input electrodes of the tube 280 in series with a resistor 296. In this unit the control voltage for overcoming the bias voltage of the battery 277, thereby to condition the discharge tube 270 for ionization, is developed across a resistor 297 which is included in the cathode leg of the output circuit of the rectifier tube 280 and is shunted by a smoothing condenser 298.

The mode of operation of the arrangement illustrated in Fig. 2 is, in general, substantially similar to that described above with reference to the arrangement shown in Fig. 1. More particularly, with the cathode heater circuits of the various tubes illustrated in Fig. 2 energized the amplifier stage 209 and the amplifier stages respectively comprising the tubes 210 and 236 are conditioned to operate with normal gain. The two amplifier tubes 211 and 237, on the other hand, are normally biased beyond cut-off by the voltages of the batteries 290 and 299' respectively. Thus, the two channels 205 and 206 are normally completely blocked so that the system is positively prevented from oscillating. With the apparatus in this condition, if sound waves impinge upon the diaphragm of the microphone 201, the resulting signal currents are amplified in the amplifier stage 209 and are delivered to the input circuit of the second amplifier tube 210. The amplified signal voltages appearing across the output circuit of this second tube are impressed across the input electrodes of the third amplifier tube 211 and also across the input electrodes of the rectifier tube 265. The resulting space current flow through the tube 265 causes a voltage to be developed across the resistor 287 which reduces the negative potential upon the start electrode 259 of the discharge tube 256 to a point where this tube becomes ionized and current flows through the two load resistors 250 and 263. The voltage developed across the resistor 263 opposes the voltage of the C battery 290 and is of such magnitude that the bias between the input electrodes of the tube 211 is sufficiently reduced to permit this tube to operate with normal gain. Accordingly, the amplified signal currents delivered to the input electrodes of the amplifier tube 211 are amplified therein and transmitted through the coupling transformer 285 and the hybrid coil 203 to the line extending to the terminals 200. The voltage developed across the resistor 250, on the other hand, is impressed as a negative bias voltage between the input electrodes of the amplifier tube 236, thus reducing the gain of this tube. By suitably proportioning the resistance value of the resistor 250, the voltage developed thereacross when space current traverses the discharge tube 256 may be proportioned to bias the tube 236 beyond cut-off such that the channel 206 is completely blocked, or to bias this tube so that it operates with only a small gain, whereby only signal currents of substantial magnitudes may be transmitted therethrough. By thus reducing the gain of the amplifier tube 236, signal currents which may be transmitted through the hybrid system 203 to the input side of the channel 206, due to an unbalanced condition of the hybrid system, are prevented from initiating the operation of the control unit comprising the rectifier tube 280 and the discharge tube 270. The relay 268 included in the output circuit of the rectifier 265 functions, in the exact manner previously explained with reference to the corresponding relay of Fig. 1, momentarily to break the space current path of the discharge tube 256 shortly following the initial signal current flow over the channel 205. During its operating period, therefore, the relay 268 momentarily blocks the transmission of signal currents through the channel 205 and increases the gain of the amplifier 236 to its normal value. When, however, the relay 268 is fully operated, the ionized condition of the tube 256 is reestablished, whereby the channel 205 is again rendered operative and the gain of the amplifier tube 236 is again reduced to an exceedingly low value. Upon operating, the relay 268 completes, at its armature 269', an obvious path for short-circuiting its upper winding, thereby to render itself exceedingly slow to release in a manner well understood in the art. By virtue of this arrangement, delay or hang-over periods are provided to prevent the blocking of the channel 205 and the unblocking of the channel 206 during the short intervals which occur between speech syllables.

When the flow of signal currents through the channel 205 is arrested, space current flow through the rectifier tube 265 ceases. As a result, the relay 268 is deenergized and the potential upon the start electrode 259 is restored to a value which will prevent space current flow through the tube 256 after this tube is deionized. After an interval determined by the release period of the relay 268, this relay restores to interrupt, at its armature 269', the path short-circuiting its upper winding, thereby to render itself reasonably fast to operate. At its armature 269, the relay 268 momentarily interrupts the output circuit of the discharge tube 256, whereby this tube is deionized and control of the space current flow therethrough is restored to the start grid 259. When the flow of space current through the tube 256 is arrested, the voltage drops across the resistors 263 and 250 are reduced to values such that the amplifier tube 211 is biased beyond anode current cut-off and the amplifier tube 236 is biased to operate with normal gain.

The mode of operation of the control unit comprising, the rectifier tube 280 and the discharge tube 270 and associated with the channel 206 is identical with that just described with reference to the unit associated with the channel 205. From the foregoing explanation it will be apparent that if the resistors 250 and 221 are properly proportioned so that the associated amplifier tubes 236 and 210 are not biased beyond cut-off whence space current traverses these resistors, each of the two channels 205 and 206 is partially active when the other channel is in use. Accordingly, conversation break-ins may occur in a manner which will be apparent from the above description. In this regard it will be apparent that in the usual installation complete blocking of each channel when the other channel is in use is not required in order to prevent singing due to the substantial side tone suppression achieved through operation of the hybrid system 203.

While there has been described what is at present considered to be the preferred embodiment of the invention, it will be understood that various modifications may be made therein, and it is contemplated to cover in the appended claims all such modifications as fall within the true spirit and scope of the invention.

I claim:

1. In a transmission system, a signal current transmission channel including amplifying means, said amplifying means including a stage comprising an electron discharge tube having a screen electrode, a control circuit having an input circuit coupled to said channel at a point preceding said amplifier stage and comprising a gaseous discharge tube including an anode and a cathode separated to define a space current path and a start electrode for controlling the flow of current over said path, means included in said input circuit for impressing a unidirectional start potential upon said start electrode when signal currents traverse said channel, means controlled by the resulting flow of space current over said path for impressing an operating potential upon said screen electrode, thereby to render said amplifier stage operative, and relay means controlled by said input circuit operative to lower momentarily the potential difference between said cathode and anode of said gaseous discharge tube when the flow of signal currents through said channel is arrested, thereby to arrest the flow of current over said path and to restore the control of said space current path to said start electrode.

2. In a transmission system, a pair of channels for transmitting signal currents in different directions, an amplifier included in one of said channels and including one amplifying stage comprising an electron discharge tube having a grid electrode, a second amplifier included in the other of said channels, a control circuit coupled to said one channel at a point preceding said one stage and comprising a gaseous discharge tube including an anode and a cathode separated to define a space current path and a start electrode for controlling the flow of current over said path, means including a rectifier for impressing a start potential upon said start electrode when signal currents traverse said one channel, means controlled by the resulting flow of space current over said path for decreasing the gain of said second amplifier and for impressing an operating potential upon said grid electrode, thereby to render said one stage operative, and means including a relay serially connected in the rectifier output circuit and operative to lower the potential difference between said anode and cathode of said gaseous discharge tube when the flow of signal currents through said one channel is arrested, thereby to arrest the flow of current over said path and to restore the control of said space current path to said start electrode.

3. In a transmission system, a pair of channels for transmitting signal currents in different directions, an amplifier included in one of said channels and including one amplifying stage comprising an electron discharge tube having a screen electrode, a second amplifier included in the other of said channels, said second amplifier comprising one stage including an electron discharge tube having a pair of input electrodes, an input circuit coupled to said input electrodes and including an impedance element for impressing a biasing potential therebetween, thereby to control the gain of said last-mentioned stage, a control circuit coupled to said one channel at a point preceding said one stage and comprising a gaseous discharge tube including an anode and a cathode separated to define a space current path and a start electrode for controlling the flow of current over said path, means for impressing a start potential upon said start electrode when signal currents traverse said one channel, thereby to initiate current flow over said path, a circuit serially including said impedance element, an additional impedance element and said space current path, said last-named circuit being so connected and arranged that the gain of said last-named amplifier stage is substantially decreased when current traverses said path, means for impressing the voltage developed across said additional impedance element upon said screen electrode, thereby to render said first-named amplifier stage operative, and means operative to lower the potential difference between said anode and cathode when the flow of signal currents through said one channel is arrested, thereby to arrest the flow of current over said path and to restore the control of said space current path to said start electrode.

4. In a transmission system, a pair of channels for transmitting signal currents in different directions, an amplifier included in each of said channels, each of said amplifiers including one stage comprising an input circuit having an input electrode biasing element included therein, a control circuit coupled to one of said channels and comprising a gaseous discharge tube including an anode and a cathode separated to define a space current path and a start electrode for controlling the flow of current over said path, a circuit serially including said biasing elements and said space current path, means for impressing a start potential upon said start electrode when signal currents traverse said one channel, whereby current is caused to traverse said space current path and said biasing elements, said biasing elements being so connected and arranged that the gain of the amplifier in said one channel is increased and the gain of the amplifier in the other of said channels is decreased when current traverses said space current path, and means operative to lower the potential difference between said anode and cathode when the flow of signal currents through said one channel is arrested, thereby to arrest the flow of current over said path and to restore the control of said space current path to said start electrode.

5. In a transmission system, a pair of channels for transmitting signal currents in different directions, a control circuit comprising a gaseous discharge tube including an anode and a cathode separated to define a space current path and a start electrode for controlling the flow of current over said path, a first output circuit coupled to said anode and cathode and serially including a source of current and an impedance element, rectifying means coupled to one of said channels and including a second output circuit coupled to impress a start potential upon said start electrode when signal currents traverse said one channel, thereby to initiate the flow of current through said first output circuit, means controlled by the voltage developed across said impedance element for controlling the signal current transmission efficiency of at least one of said channels, a relay comprising a winding serially included in said second output circuit, and means controlled by said relay for momentarily opening said first output circuit when signal flow through said channel is started and stopped, thereby to arrest the flow of current over said first output circuit and to restore the control of said space current path to said start electrode.

6. Loud-speaking telephone substation apparatus adapted to be connected to a conventional two conductor telephone line of variable impedance comprising in combination a receiving amplifying channel, a transmitting amplifying channel, each of said channels including a space discharge device, means normally blocking the said device in said receiving channel, means comprising a rectifier having discontinuous output characteristics to provide a controlled potential source, and means responsive to the signal strength impressed on said receiving channel to control said rectifier, said rectifier when so controlled being operative to unblock the said device in said receiving channel and to block the said device in said transmitting channel.

7. Apparatus according to claim 6 further including means to adjust the signal level required to effect said control of said rectifier.

8. Loud-speaking telephone substation apparatus adapted to be connected to a line of variable impedance comprising in combination a receiving amplifying channel arranged to be connected directly with said line, a transmitting amplifying channel, a voltage transforming network intermediate said last mentioned channel and said line, each of said channels including a space discharge device, a potential source means comprising said source to normally maintain the said device in said receiving channel in blocked condition and the said device in said transmitting channel in operative condition, means responsive to the signal strength impressed on said receiving channel to effect a condition, means responsive to the signal strength existent in the output line of said transmitting channel to effect a condition in opposition to said first mentioned condition, and means responsive to the balance between said two conditions in control of the potential of said source whereby said channels are alternately conditioned for signal passage in accordance with directional signal conditions.

9. Telephone substation apparatus comprising in combination a receiving amplifying channel and a transmitting amplifying channel each having a space discharge device operative to alternately block and condition its associated channel, a control network for said devices, a signal strength responsive device operative to effect a condition in proportion to the incoming signal strength impressed on said receiving channel, a second signal strength responsive device operative to effect a condition in proportion to the strength of output of said transmitting channel and in opposition to said first mentioned condition, means to control said network in accordance with the degree of balance between said two conditions, and means to diminish the efficacy of said first mentioned responsive device upon increase of signal strength impressed on said second mentioned responsive device.

10. Telephone substation apparatus comprising in combination a receiving amplifying channel and a transmitting amplifying channel each having a control device therein operative to alternately block and condition the channel, a control circuit for said devices operative to effect the blocking of one channel while the other is conditioned and vice versa, a signal strength responsive device operative to effect a condition in proportion to the incoming signal strength impressed on said receiving channel, a second signal strength responsive device operative to effect a condition in proportion to the strength of output of said transmitting channel and in opposition to said first mentioned condition, means to control said circuit in accordance with the degree of balance between said two conditions, and means to diminish the efficacy of said first mentioned responsive device upon increase of signal strength impressed on said second mentioned responsive device.

11. Telephone substation apparatus comprising in combination a pair of conductors adapted to be connected to a line, a receiving amplifying channel coupled to said conductors, a transmitting amplifying channel coupled to said conductors through a voltage transforming network, a device in each of said channels operative to alternately block and condition the channels, a control circuit for said devices operative to effect the blocking of one channel while the other channel is conditioned and vice versa, means to effect a condition in response to the signal strength impressed on said receiving channel, means to effect a condition responsive to the signal strength existent in the interconnection between said transmitting channel and said voltage transforming network and in opposition to said first mentioned condition, and means to control said circuit in accordance with the degree of balance between said two conditions whereby said channels are alternately conditioned for signal passage in accordance with directional signal conditions.

ROSWELL H. HERRICK.